CLEVE ZANE MILES
INVENTOR.

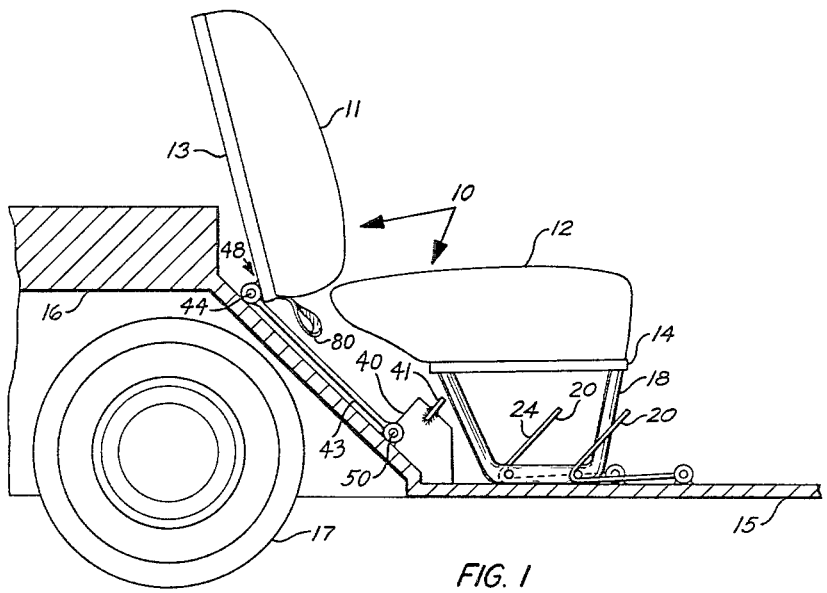
FIG. 1
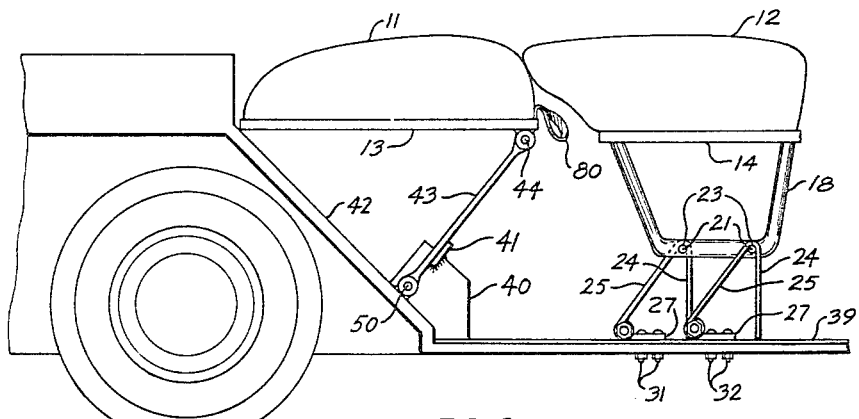
FIG. 2
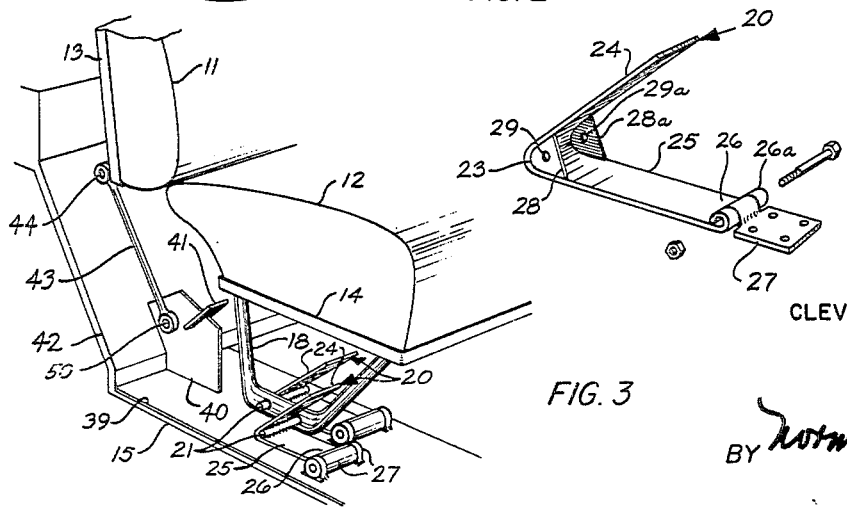
FIG. 3
FIG. 3a
CLEVE ZANE MILES
INVENTOR.
BY Norman L. Chief
AGENT Oct. 21, 1969  C. Z. MILES  3,473,840
VEHICLE SEAT CONVERTIBLE TO A BED OR COUCH
Filed May 18, 1967  2 Sheets-Sheet 2

BY Norman L. Chalfin
AGENT

United States Patent Office 3,473,840
Patented Oct. 21, 1969

3,473,840
VEHICLE SEAT CONVERTIBLE TO A
BED OR COUCH
Cleve Zane Miles, 16804 Magnolia Blvd.,
Encino, Calif. 91316
Filed May 18, 1967, Ser. No. 639,452
Int. Cl. B60n 1/10; A47c 13/00
U.S. Cl. 296—69                                    4 Claims

ABSTRACT OF THE DISCLOSURE

The existing seat of an automobile passenger vehicle is equipped with novel linkages between seat and back to permit raising the seat and articulating the back into parallel alignment with the seat to form thereby a bed or couch.

BACKGROUND OF THE INVENTION

This invention relates to seats convertible to beds and more particularly to such seats in small bus-like passenger vehicles.

In the prior art specially prepared seat and back elements are provided and require that the existing seats be removed from the passenger vehicle in order to permit installation of the specially prepared components for use in forming a bed in the vehicle.

SUMMARY OF THE INVENTION

This invention contemplates novel means which can be readily attached to the existing seats of automotive passenger vehicles such as small busses, station wagons, and sedans and to the body of the vehicle by which the seat portion and back portion of the seats may be moved and articulated with respect to one another into alignment side-by-side with one another to form a bed or couch and, when not needed as a couch, the seat and back are returned to the normal seat configuration.

Implementation of the invention includes a series of brackets, articulating elements and appropriate plates and hardware with which to interconnect the existing seat and back with the vehicle body to accomplish the conversion and provide the movability in arcuate paths necessary to move the seat and back from their seat configuration to the bed or couch configuration, and return to their normal configuration.

The particular novelty of the invention lies in the brackets and associated components by which the articulation and paths of motion of the seat and back are moved and controlled in their respective transitions from a seat to a bed or couch, and return to seat again.

The principal object of the invention is to provide means for a more easily accomplished conversion of the existing seat in a vehicle from a normal auto, bus, or station wagon seat or the like to a bed or couch by the addition to the existing seat of novel articulating brackets and hardware, permitting ready movement of the converted article between the seat and bed configurations thereof and locking the article into either configuration.

This and other objects of the invention and advantages thereof will be more fully understood from the specification which follows and from the drawings in which a preferred embodiment is shown as applied to a particular vehicle.

DESCRIPTION OF THE INVENTION

FIGURE 1 is a side elevational view of an automotive vehicle seat and back converted according to this invention;

FIGURE 2 is a side elevational view of the automotive vehicle seat when moved into the couch or bed position;

FIGURE 3 is a partially cut away perspective view of the automotive vehicle seat according to the invention to show the various parts involved in the assembly thereof;

FIGURE 3a shows an alternate embodiment of the V-shaped bracket;

Figure 4:
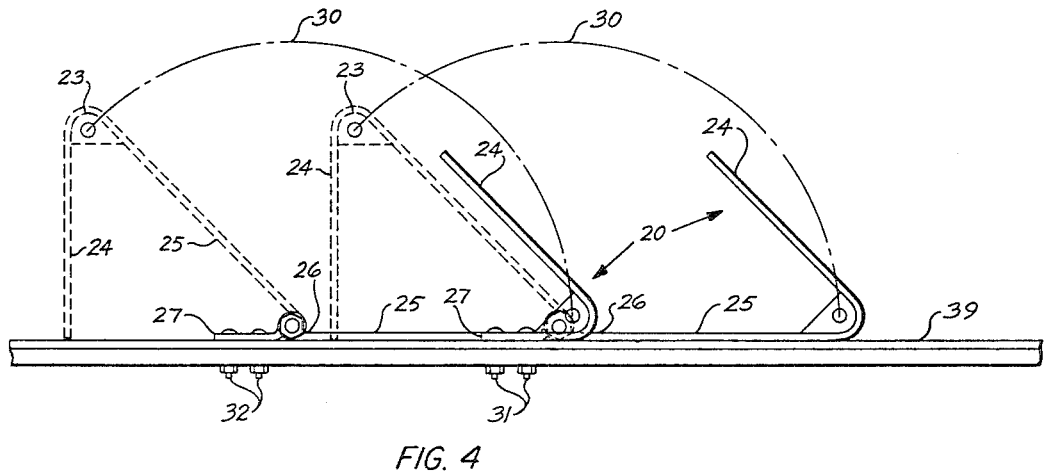
FIGURE 4 is a schematic of the floor bracket elements of the invention showing their respective articulation paths and their respective seat and bed positions of the seat portion.

The combination of elements which make up this invention include a conventional automotive vehicle seat generally indicated by arrows 10 such as may be found in a station wagon or small bus. Such seats as 10 include a back portion 11 and a seat portion 12 usually of padding and inner spring construction, as is well known, and each respectively attached to respective frames 13, 14.

In the drawings of FIGURES 1–3 the vehicle frame and body floor are indicated at 15, 16 which in part form a wheel cover or nacelle in some vehicles. Such a wheel is indicated in part at 17.

The seat frame 14 is normally horizontal and is supported on a vertical tubular frame 18.

As may be seen in the figures, four V-shaped support brackets 20 are provided. (Only two are visible in the figures but it should be obvious that the opposite side of the vehicle has identical support legs 20.) These support legs 20 are equipped with pivot elements 21 which are welded inside the junctions 23 of the two sides 24, 25 of the V's 20. Other pivot elements 27 are welded to the free end 26 of V element 25. Pivot element 27 may be a hinge as shown at FIGURE 3a.

An alternate configuration of the V bracket 20 is shown in FIGURE 3a in which end 26 has been rolled to produce a pivot member 26a and in which drilled gusset plates 28, 28a have been welded to the V junction 23 to produce aligned apertures for a pivot pin 21 through 29–29a.

This may be seen in FIGURE 4 which represents a view, in schematic form, of the opposite side of a seat 12 from that shown in FIGURE 3. In FIGURE 4 the V-brackets 20 are shown in their seat positions in solid line and in their bed positions in dashed line. The arcs of movement 30 are drawn for the rotation of pivot point 29 about a pivot center formed by pivot ends 26. It should be noted here that the pivot axes at points 26 are welded or bolted to a base plate 39 which itself may be bolted to the vehicle body or frame 15 as shown by bolts 31, 32 in FIGURE 2.

Figure 5:
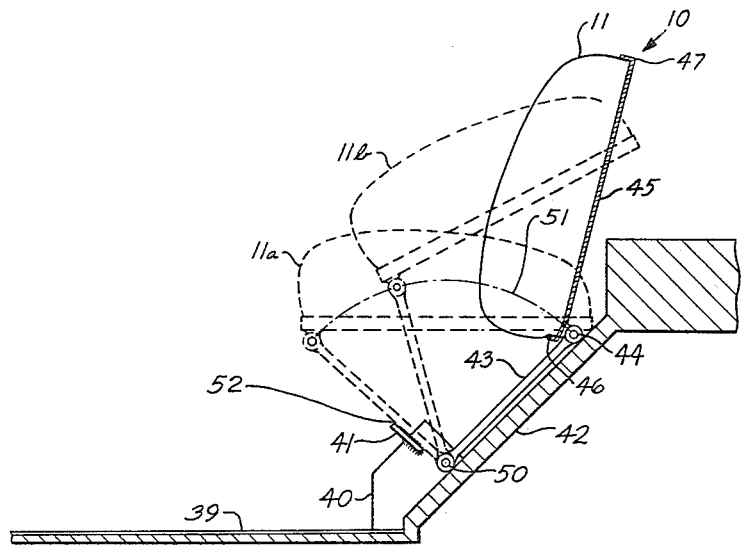
FIGURE 5 is a schematic of the bracket and articulating elements of the back portion showing the respective seat and bed positions thereof and the paths followed by the articulating elements.

Referring now again to FIGURES 1–3 and to FIGURE 5, a plate 40 is shown having a stop member 41 therein. Plate 40 may be bolted or rivited or otherwise secured to the side cover of the wheel nacelle 42. FIGURE 5, it should be noted, is generally schematic and taken from the opposite side of the seat 20 from that shown in FIGURES 1, 2, and 3.

The back 11 of seat 10 is shown in its seat position in solid line and in its bed position 11a in dashed line in FIGURE 5. An intermediate position in dotted line is also shown at 11b.

An angle iron support post 43 articulatingly attached by one end thereof to a hinge 44 which is on a rigid metal strap 45 bent at opposite ends 46, 47 and secured to the rear of seat back 11. The hinge 44 is near the bottom 48 of seat 11 on strap 45.

The opposite end 50 of support post 43 is pivotally attached to plate 40, articulating thereon so that hinge point 44 travels through arc 51 as shown in FIGURE 5. Post 43 comes to rest on stop 41 in plate 40 at point 52 which may be seen in the bed position in FIGURE 2 and in FIGURE 5.

Referring now to all of the figures generally, the overall operation of the new conversion means and equipment for a passenger bus or station wagon seat, so that it may be moved into a couch or a bed position, may be more easily understood to be as follows:

The existing seat 10 of a vehicle with seat portion 12 and back portion 11, is employed. The back 11 is equipped near either end thereof with brackets straps 45, 46, 47, near the bottom end of which is included a hinge 44. To hinge 44 is coupled, articulatingly, one end of a support bracket 43. The other end of support bracket 43 is articulatingly coupled to a plate 40 attached to the wheel nacelle cover 42. Plate 40 has a stop member 41 therein against which bracket 43 rests as a limit to the motion of bracket 43 when its end 44 moves through an arc 51 pivoting on pivot end 50 so that seat back 11 may be moved into a horizontal position 11a through a position 11b.

The seat portion 12 is supported on a tubular pedestal 18. The bottom of tubular support pedestal 18 is drilled to be coupled with pivots 21 in V-end 23 of a V-bracket 20. Two such V-brackets 20 are provided for on each side of the seat. The two on each side are themselves mounted on a plate 39 bolted to the body floor of the vehicle. The mounting of the V-brackets 20 is such that one V-end 24 is free and the other V-end 25 in the seat configuration of the assembly rests on the plate 39 as may be seen in FIGURE 3 particularly. End 26 of V-portion 25 is mounted to a hinge 27 so that the V-bracket 20 may lift upon hinge 27 to the position shown in FIGURES 2 and 4 so that the base of pedestal 18 is raised, thereby lifting seat 12 into alignment with, and forward of, the back 11.

The plate 40 and the plate 39 may be fabricated from a single piece of metal for convenience of assembly.

What is claimed as new is:

1. In combination with an automotive vehicle:
   a seat assembly having separable seat and back portions;
   a supporting frame under said seat portion normally supporting said seat in a first position on the floor of said vehicle;
   four V-shaped members each, respectively, normally lying on its side with one free end of the V hingedly attached to the floor of said vehicle along side said supporting frame, the apex of each of the V's of said V-shaped members being pivotally attached near a respective corner of said supporting frame;
   each of said V-shaped members being in a first position wherein said one free end is parallel with said frame on said floor of said vehicle and being articulatable on said hinged attachment thereof to said seat frame, to an "inverted" V-position wherein said apex thereof and said seat frame move in an arc to raise said seat to a second position above and forward of said first position; and
   a pair of hinging brackets articulatingly attached between the bottom end of said back portion of said seat assembly and the frame of said vehicle so that said back portion of said seat may be pulled forward on said hinging brackets, articulating back upon said hinging brackets into a position in the same plane and behind said seat portion in said second position thereof to form together with said seat portion a bed.

2. In an automotive vehicle:
   a seat assembly having separable seat and back portions;
   a first set of movable V-shaped supporting brackets articulatingly attached to said seat portion and each including a leg portion pivotally attached to the floor of said vehicle; and
   a second set of movable hinging supporting brackets attached between said back portion and the frames of said vehicle;
   said seat portion being hingedly movable on said V-shaped supporting brackets between a first normal seat position and a second position raised above said normal seat position forward of said first position, said back portion being movable on said hinging support between a first normal seat position to a second position behind and in the same plane as said seat portion in said second raised position thereof forming a bed in said vehicle.

3. An automotive vehicle seat assembly convertible to a bed, said seat assembly comprising:
   a seat portion having four V-shaped lifting brackets articulatingly attached to the seat portion and each including a leg portion pivotally attached to the floor of the vehicle in which the seat convertible to a bed is installed; and
   a back portion having a pair of articulating support bars pivotally attached between said back portion and the frame of the vehicle in which the seat convertible to a bed is installed;
   said back portion being rotatable on said support bars and said seat portion being liftable by said lifting brackets into an in-line end-to-end relationship forming thereby a bed.

4. In the seat assembly defined in claim 3,
   the V-shaped lifting brackets including a hasp hinge at the ends thereof attached to said floor of said vehicle, and the support bars thereof including a pivot bracket attached to said frame of said vehicle and a stop member located on said pivot bracket in a position to limit the motion of said support bar pivoting thereon.

References Cited

UNITED STATES PATENTS

| | | | |
|---|---|---|---|
| 3,140,114 | 7/1964 | Stephenson et al. | 296—69 |
| 3,188,134 | 6/1965 | Nixon | 296—69 |
| 3,282,625 | 11/1966 | Logan | 296—69 XR |

PHILIP GOODMAN, Primary Examiner

J. A. PEKAR, Assistant Examiner

U.S. Cl. X.R.

297—118